(12) United States Patent
Zhang et al.

(10) Patent No.: US 8,761,296 B2
(45) Date of Patent: Jun. 24, 2014

(54) METHOD AND APPARATUS FOR ANTENNA TUNING AND TRANSMIT PATH SELECTION

(71) Applicant: QUALCOMM Incorporated, San Diego, CA (US)

(72) Inventors: Xiangdong Zhang, Westford, MA (US); Jay Rodney Walton, Carlisle, MA (US); Mark S. Wallace, Boxborough, MA (US); Puay Hoe See, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/791,519

(22) Filed: Mar. 8, 2013

(65) Prior Publication Data

US 2013/0322562 A1 Dec. 5, 2013

Related U.S. Application Data

(60) Provisional application No. 61/654,550, filed on Jun. 1, 2012.

(51) Int. Cl.
| | | |
|---|---|---|
| H04B 7/02 | (2006.01) | |
| H04B 7/04 | (2006.01) | |
| H04B 1/04 | (2006.01) | |
| H04B 7/08 | (2006.01) | |
| H04B 7/06 | (2006.01) | |
| H04B 17/00 | (2006.01) | |

(52) U.S. Cl.
CPC ............ *H04B 7/0404* (2013.01); *H04B 1/0458* (2013.01); *H04B 7/0808* (2013.01); *H04B 7/0608* (2013.01); *H04B 17/0022* (2013.01); *H04B 17/0007* (2013.01); *H04B 7/082* (2013.01)

USPC .......................................................... 375/267

(58) Field of Classification Search
CPC .. H04B 7/0404; H04B 1/0458; H04B 7/0608; H04B 17/0022; H04B 7/082; H04B 17/0007; H04B 7/0808
USPC ........................... 375/267, 299; 455/101, 121
See application file for complete search history.

(56) References Cited

U.S. PATENT DOCUMENTS

| | | | |
|---|---|---|---|
| 6,920,315 B1 * | 7/2005 | Wilcox et al. ................. | 455/121 |
| 7,206,555 B2 | 4/2007 | Boyle et al. | |
| 7,366,139 B2 | 4/2008 | Poegel et al. | |
| 8,232,925 B2 * | 7/2012 | Knudsen et al. .............. | 343/702 |

(Continued)

FOREIGN PATENT DOCUMENTS

WO 2007018803 A2 2/2007

OTHER PUBLICATIONS

International Search Report and Written Opinion—PCT/US2013/043717—ISA/EPO—Aug. 13, 2013.

*Primary Examiner* — Juan A Torres
(74) *Attorney, Agent, or Firm* — QUALCOMM IP Department; James Hunt Yancey, Jr.

(57) ABSTRACT

Certain aspects of the present disclosure propose a method and an apparatus for antenna tuning and transmit path selection in an RF system. A method may include antenna diversity path selection by (optionally) diagnosing damaged antennas, tuning antennas, and selecting an antenna with better performance. Embodiments can be used in wireless radio-frequency (RF) front-ends. Other aspects, embodiments, and features are also claimed and described.

30 Claims, 11 Drawing Sheets

(56) References Cited

U.S. PATENT DOCUMENTS

| | | |
|---|---|---|
| 2001/0039198 A1* | 11/2001 | Onishi et al. .................. 455/562 |
| 2002/0175878 A1* | 11/2002 | Toncich ........................ 343/860 |
| 2004/0166909 A1 | 8/2004 | Lee |
| 2004/0214607 A1* | 10/2004 | Namiki ...................... 455/562.1 |
| 2005/0085204 A1* | 4/2005 | Poilasne et al. ............ 455/193.1 |
| 2005/0093624 A1* | 5/2005 | Forrester et al. .............. 330/129 |
| 2007/0093282 A1 | 4/2007 | Chang et al. |
| 2008/0214243 A1* | 9/2008 | Forrester .................... 455/562.1 |
| 2009/0231220 A1 | 9/2009 | Zhang et al. |
| 2010/0215111 A1 | 8/2010 | Filipovic et al. |
| 2011/0249760 A1 | 10/2011 | Chrisikos et al. |
| 2011/0306310 A1 | 12/2011 | Bai |
| 2013/0040581 A1* | 2/2013 | Alberth et al. ................. 455/70 |

\* cited by examiner

METHOD AND APPARATUS FOR ANTENNA TUNING AND TRANSMIT PATH SELECTION

PRIORITY CLAIM

The present Application for Patent claims priority to and the benefit of U.S. Provisional Patent Application Ser. No. 61/654,550, filed Jun. 1, 2012 and assigned to the assignee hereof and hereby expressly incorporated by reference herein as if fully set forth below for all applicable purposes.

TECHNICAL FIELD

The technology discussed below generally relates to wireless communications and, more particularly, to antenna tuning and transmit path selection and optimization. As discussed in more detail below, aspects of the technology discussed below enable and provide improved communication as well as improved use of power resources.

BACKGROUND

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP Long Term Evolution (LTE) systems, and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out, multiple-in-single-out or a multiple-in-multiple-out (MIMO) system.

In wireless communication systems, impedance matching may be required to optimize energy transfer from a source to a load in radio-frequency (RF) circuits. One of the more challenging applications for impedance matching is between a transmitter as a source and an antenna as a load. A poor impedance match results in the inefficient transfer of power to the antenna. As a result, transmit power may need to be increased to compensate, reducing battery life in mobile devices. Similarly, mismatch between an antenna as a source and a receiver as a load results in reduced received signal quality-albeit with less impact on power consumption. Antenna matching becomes even more challenging in wireless devices that utilize multiple antennas designed to support a wide range of air interfaces and operating bands.

BRIEF SUMMARY OF SOME SAMPLE EMBODIMENTS

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

Certain aspects of the present disclosure provide a method for wireless communications. The method generally includes detecting antenna conditions indicative of impedance mismatch for first and second antennas, tuning the first and the second antennas, based on the detected antenna conditions, in an effort to reduce impedance mismatch in their respective radio frequency (RF) chain, evaluating the antenna conditions after the tuning, and selecting at least one of the first antenna or the second antenna for transmission and/or reception based on evaluation of the antenna conditions after the tuning.

Other embodiments can include user equipment (UE) for use in communication networks (e.g., wireless systems). For example, some UEs can generally comprise a plurality of antennas, detection circuitry, tuning circuitry, a cross switch, and processor. The plurality of antennas can comprise at least first and second antennas. The detection circuitry can detect antenna conditions indicative of impedance mismatch for the first and second antennas. The tuning circuitry can tune the first and the second antennas, based on the detected antenna conditions, to reduce impedance mismatch in their respective radio frequency (RF) chain. The cross-switch can selectively include at least one of the first or second antennas in at least one of a transmission path or diversity receive path. The processor can be configured to evaluate antenna conditions after the tuning. The processor can also be configured to select, via the cross-switch, at least one of the first antenna or the second antenna for at least one of transmission via the transmission path or reception via the diversity receive path, based on the evaluation of the antenna conditions after the tuning Some embodiments can include a computer program product comprising a computer readable medium having instructions stored thereon. The instructions can executable by one or more processors for detecting antenna conditions indicative of impedance mismatch for first and second antennas; tuning the first and the second antennas, based on the detected antenna conditions, to reduce impedance mismatch in their respective radio frequency (RF) chain; evaluating the antenna conditions after the tuning; and selecting at least one of the first antenna or the second antenna for at least one of transmission or reception, based on the evaluation of the antenna conditions after the tuning.

Some embodiments can also include apparatuses for wireless communications comprising. The embodiments can include a communication interface (e.g., receiver, transmitter, transceiver, etc.) operatively coupled to a processor. The processor can be configured to detect antenna conditions indicative of impedance mismatch for first and second antennas, tune the first and the second antennas, based on the detected antenna conditions, to reduce impedance mismatch in their respective radio frequency (RF) chain, evaluate the antenna conditions after the tuning, and select at least one of the first antenna or the second antenna for at least one of transmission or reception, based on the evaluation of the antenna conditions after the tuning.

Still yet other embodiments can include an apparatus for wireless communications that comprises one or more means. The means can have the structure of various components discussed herein for carrying out their associated functions. One means can be a means for detecting antenna conditions indicative of impedance mismatch for first and second antennas. Another means can be a means for tuning the first and the second antennas, based on the detected antenna conditions, to reduce impedance mismatch in their respective radio frequency (RF) chain. Yet another means can be a means for evaluating the antenna conditions after the tuning Still yet another means can be a means for selecting at least one of the first antenna or the second antenna for at least one of transmission or reception, based on the evaluation of the antenna conditions after the tuning Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

Figure 1:
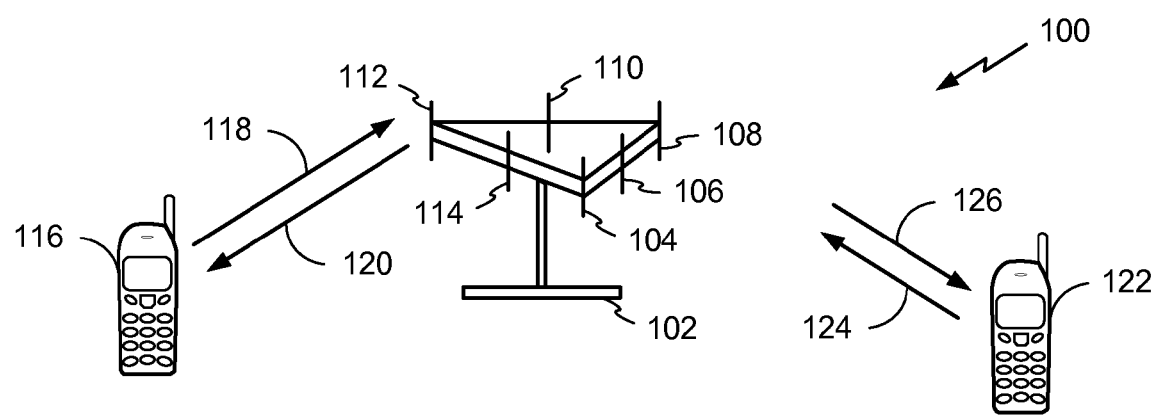
FIG. 1 illustrates a multiple access wireless communication system in accordance with some embodiments.

Certain aspects of the present disclosure provide techniques that may be incorporated as an RF system solution for antenna diversity path selection and optimization. As will be described in greater detail, some techniques may involve diagnostic, tuning, and switching functions in RF front-ends (e.g., in mobile phones, wireless devices, or other communication components).

According to certain aspects, a "Cross" switch may be utilized to select a transmit (Tx) path to either a primary or diversity antenna. The cross switch may also be utilized to select or, in some cases, disable a diversity receive (Rx) path. An antenna switching and selection algorithm may be utilized to control the cross switch based on monitored antenna conditions. Monitored antenna conditions can include conditions such as Tx power loss and antenna impedance mismatch. The cross switch, along with power and impedance detection for both primary and diversity antennas, may allow closed-loop control of both primary and diversity receive and transmit paths.

As used herein, the term mismatch generally refers to a difference in impedance between a source and a load. For example, in a transmit chain, mismatch may refer to a difference in impedance between transmit circuitry and the antenna. In a receive chain, mismatch may refer to a difference in impedance between the antenna and receive circuitry. Power loss caused by mismatch loss (ML) may be measured as a function of the difference between incident power and actual radiated power. For example, ML may be measured as the ratio of incident power to the difference between incident and reflected power. In various embodiments, varying ranges or thresholds of ML can be utilized for tuning. Selection of specific parameters can be done as desired or based on implementation factors (e.g., antenna design, spacing, size, etc.). Acceptable levels of ML may depend on a particular implementation and may also vary with time and/or operating conditions. Further, when selecting antennas, acceptable levels of ML may be relative. In other words, an antenna may still be selected if its ML is better than an alternate antenna, even though its ML would otherwise be unacceptable. As will be described in greater detail below, various circuits may be utilized to monitor and detect impedance and power loss.

Techniques presented herein may be incorporated in an RF "front end." The term RF front end generally refers to components between an antenna and a digital baseband system. These components may include filters, low-noise amplifiers (LNAs), and mixer(s) that process modulated signals received at an antenna into signals suitable for input into a baseband analog-to-digital converter (ADC) or to process modulated signals for transmission.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal A terminal can also be called a system, device, subscriber unit, subscriber station, mobile station, mobile, mobile device, remote station, remote terminal, access terminal, user terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), CDMA 2000, etc. UTRA includes Wideband-CDMA (W-CDMA). CDMA2000 covers IS-2000, IS-95 and IS-856 standards. A TDMA network may implement a radio technology such as Global System for Mobile Communications (GSM).

An OFDMA network may implement a radio technology such as Evolved UTRA (E-UTRA), The Institute of Electrical and Electronics Engineers (IEEE) 802.11, IEEE 802.16, IEEE 802.20, Flash-OFDM®, etc. UTRA, E-UTRA, and GSM are part of Universal Mobile Telecommunication System (UMTS). Long Term Evolution (LTE) is a recent release of UMTS that uses E-UTRA. UTRA, E-UTRA, GSM, UMTS and LTE are described in documents from an organization named "3rd Generation Partnership Project" (3GPP). CDMA2000 is described in documents from an organization named "3rd Generation Partnership Project 2" (3GPP2). These various radio technologies and standards are known in the art. For clarity, certain aspects of the techniques are described below for LTE, and LTE terminology is used in much of the description below. It should be noted that the LTE terminology is used by way of illustration and the scope of the disclosure is not limited to LTE. Rather, the techniques described herein may be utilized in various applications involving wireless transmissions, such as personal area networks (PANs); body area networks (BANs), location, Bluetooth, GPS, UWB, RFID, and the like. Further, the techniques may also be utilized in wired systems, such as cable modems, fiber-based systems, and the like.

Single carrier frequency division multiple access (SC-FDMA), which utilizes single carrier modulation and frequency domain equalization has similar performance and essentially the same overall complexity as those of an OFDMA system. SC-FDMA signal may have lower peak-to-average power ratio (PAPR) because of its inherent single carrier structure. SC-FDMA may be used in the uplink communications where lower PAPR greatly benefits the mobile terminal in terms of transmit power efficiency. SC-FDMA is currently a working assumption for uplink multiple access scheme in 3GPP Long Term Evolution (LTE), or Evolved UTRA.

Referring to FIG. 1, a multiple access wireless communication system 100, in which aspects of the present disclosure may be practiced, is illustrated. For example, aspects of the present disclosure may be implemented in wireless devices, such as access terminals 116 and 122, for antenna diversity path selection and optimization. The techniques may be utilized in any variety of air interfaces, such as those identified above, and over a wide variety of operating bands.

An access point 102 (AP) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal 122 is in communication with antennas 106 and 108, where antennas 106 and 108 transmit information to access terminal 122 over forward link 126 and receive information from access terminal 122 over reverse link 124. In a Frequency Division Duplex (FDD) system, communication links 118, 120, 124 and 126 may use a different frequency for communication. For example, forward link 120 may use a different frequency than that used by reverse link 118.

Each group of antennas and/or the area in which they are designed to communicate is often referred to as a sector of the access point. In an aspect, antenna groups each are designed to communicate to access terminals in a sector of the areas covered by access point 102.

In communication over forward links 120 and 126, the transmitting antennas of access point 102 may utilize beamforming to improve the signal-to-noise ratio of forward links for the different access terminals 116 and 122. Also, an access point using beamforming to transmit to access terminals scattered randomly through its coverage causes less interference to access terminals in neighboring cells than an access point transmitting through a single antenna to all its access terminals.

An access point may be a fixed station used for communicating with the terminals and may also be referred to as a Node B, an evolved Node B (eNB), or some other terminology. An access terminal may also be called a mobile station, user equipment (UE), a wireless communication device, terminal, or some other terminology. For certain aspects, either the AP 102 or the access terminals 116, 122 may utilize the proposed interference cancellation technique to improve performance of the system.

Figure 2:
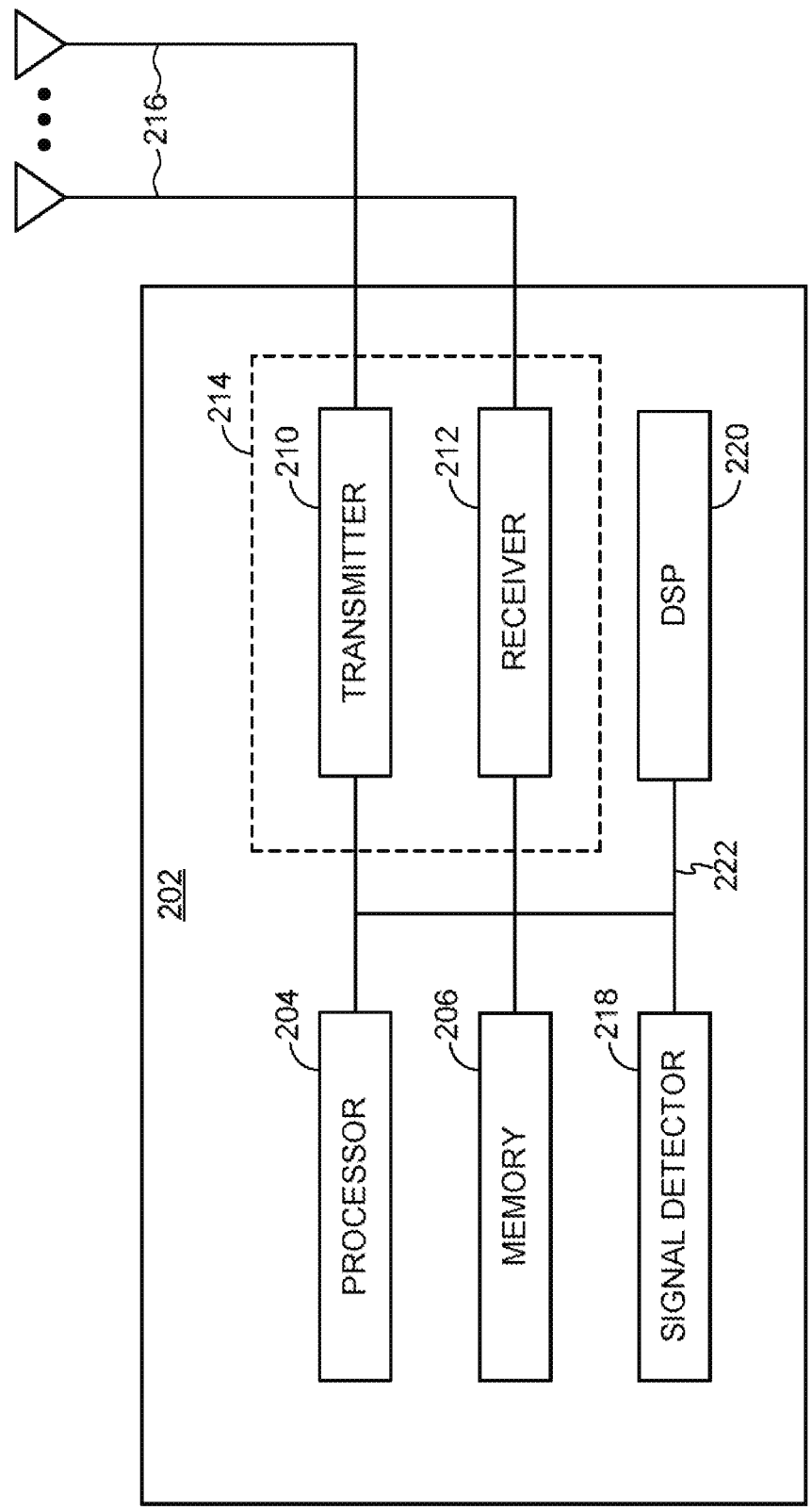
FIG. 2 illustrates an example wireless device in which a switchable transmit (Tx) path for diversity may be controlled in accordance with some embodiments.

FIG. 2 illustrates various components that may be utilized in a wireless device 202 that may be employed within the wireless communication system illustrated in FIG. 1. The wireless device 202 is an example of a type of device that may be configured to implement the various methods for antenna selection described herein. While the wireless device 202 may be a base station 100 or any of user terminals 116 and 122 of FIG. 1, the below detailed description may interchangeably refer to the wireless device 202 as a user equipment (UE).

The wireless device 202 may include a transmitter 210 and a receiver 212, which may be combined into a transceiver 214, allow over the air communication via one or more antennas 216. The wireless device 202 may also include at least one processor 204 which controls operation of the wireless device 202. The processor 204 may also be referred to as a central processing unit (CPU). In some devices, separate processors may be provided for modem functions (often referred to as a modem processor) and other functions (often referred to as an application processor). As illustrated, the wireless device 202 may include various other types of processors, such as a digital signal processor (DSP) 220 and signal detector 218). The various components of the wireless device 202 may be coupled together by a bus system 222.

Memory 206, which may include both read-only memory (ROM) and random access memory (RAM), provides instructions and data to the processor 204. A portion of the memory 206 may also include non-volatile random access memory (NVRAM). However, additional and/or other memories of any suitable type may be employed. The instructions may be executable by processor 204 to perform various operations, including the operations for antenna selection described herein.

According to certain aspects, the memory 206 may be configured to store various information (e.g., information about transmission power) received, obtained, and/or collected from base stations according to techniques described further below. In one implementation, the memory 206 may also include various reference values that may be used in antenna selection operations, such as previously measured impedance values for a selected antenna or reference impedance values stored as a factory default setting.

In some cases, a database (or look-up table) may be periodically updated with different values based on impedance measurements taken for each antenna. In this manner, threshold reference impedance values may be adjusted to reflect changes in impedance over time. The database can be stored in memory 206 that is accessible by a processor 204 for determinations of antenna selection and tuning. The database can have varying sizes and may be configured to be dynamically updated as desired. In some scenarios, multiple databases may be utilized for locations in which the wireless device 202 may operate within frequently (e.g., home, work, sporting events, airports etc.). By having and/or using a database, a wireless device 202 can refer to stored data when its components are determining when it may be prudent to select and tune antennas for transmission and reception of wireless signals.

Certain aspects of the present disclosure provide techniques that may be incorporated as part of an RF system solution for antenna diversity path selection and optimization. Embodiments can help achieve various goals, such as detecting mismatch and damage of primary and diversity antennas, tuning of both antennas to reduce mismatch to improve antenna gain, and measuring Tx power loss through a currently selected antenna to help select a transmit antenna to achieve optimal transmission power. In some cases, receive diversity paths may be disabled, for example, to conserve power.

As noted above, in some cases, a cross switch may be utilized to select a transmit (Tx) path to either a primary or diversity antenna. The cross switch may be controlled based on an algorithm (e.g. those discussed herein) that takes into consideration varying antenna conditions (e.g., impedance mismatch and power loss). By combining a cross switch with the ability to detect mismatch for each antenna and tune each antenna, an intelligent switching algorithm may be utilized to select an optimal transmit path and, in some cases, enable/disable receive diversity.

Some conventional systems have utilized a cross switch to allow for selection of transmit path between primary and secondary antennas. In a first state, the cross switch may provide a transmit path to a primary antenna (P-antenna) and a receive diversity path from a diversity antenna (D-antenna). In a second state, the cross switch may switch the transmit path to the diversity antenna and the receive diversity path from the primary antenna. In this relatively simple example, there is always a RX diversity path which, in some cases, may result in unnecessary power consumption. With this simple Tx switching algorithm, the switchable Tx path may be far from optimal in terms of power saving and thru-put performance.

Conventional power control-based Tx selection is relatively slow. While temporary changes in antenna condition (e.g., changes in antenna gain due to Hand/head effect) may be mitigated through the Tx selection algorithm based on the Geo-sensor-based selection, this simple algorithm, does not allow for detection of damaged antenna to prevent unnecessary switching.

Because such conventional switching systems are unable to detect just how bad an antenna condition may be, they may be relatively slow to react. For example, such systems may need to wait for power information from a base station transceiver (BST), needlessly wasting power and time until then. Further, relatively simple conventional switching systems do not provide mechanisms to tune antennas to improve antenna performance under hand/head effects.

As will be described in greater detail below, techniques and systems presented herein may allow for early detection of damaged antennas. This can enable quick selecting and/or switching to better performing antennas without having to wait for feedback from the BST. As a result, techniques and systems presented herein provide mechanisms to tune antennas to improve antenna performance, for example, under hand/head effects.

According to certain aspects presented herein, an antenna switching and selection algorithm may be utilized to control the cross switch based on monitored antenna conditions, such as Tx power loss and antenna mismatch. The ability to tune and detect mismatch of each antenna may allow for closed-loop control of both primary and diversity antenna paths. The algorithm may also control the cross switch to select or, in some cases, disable a diversity receive (Rx) path. In some cases, diversity Rx paths may be selected and/or disabled based on monitored Tx power performance. In other cases, diversity Rx paths may be selected and/or disabled independently of Tx power performance.

Figure 3:
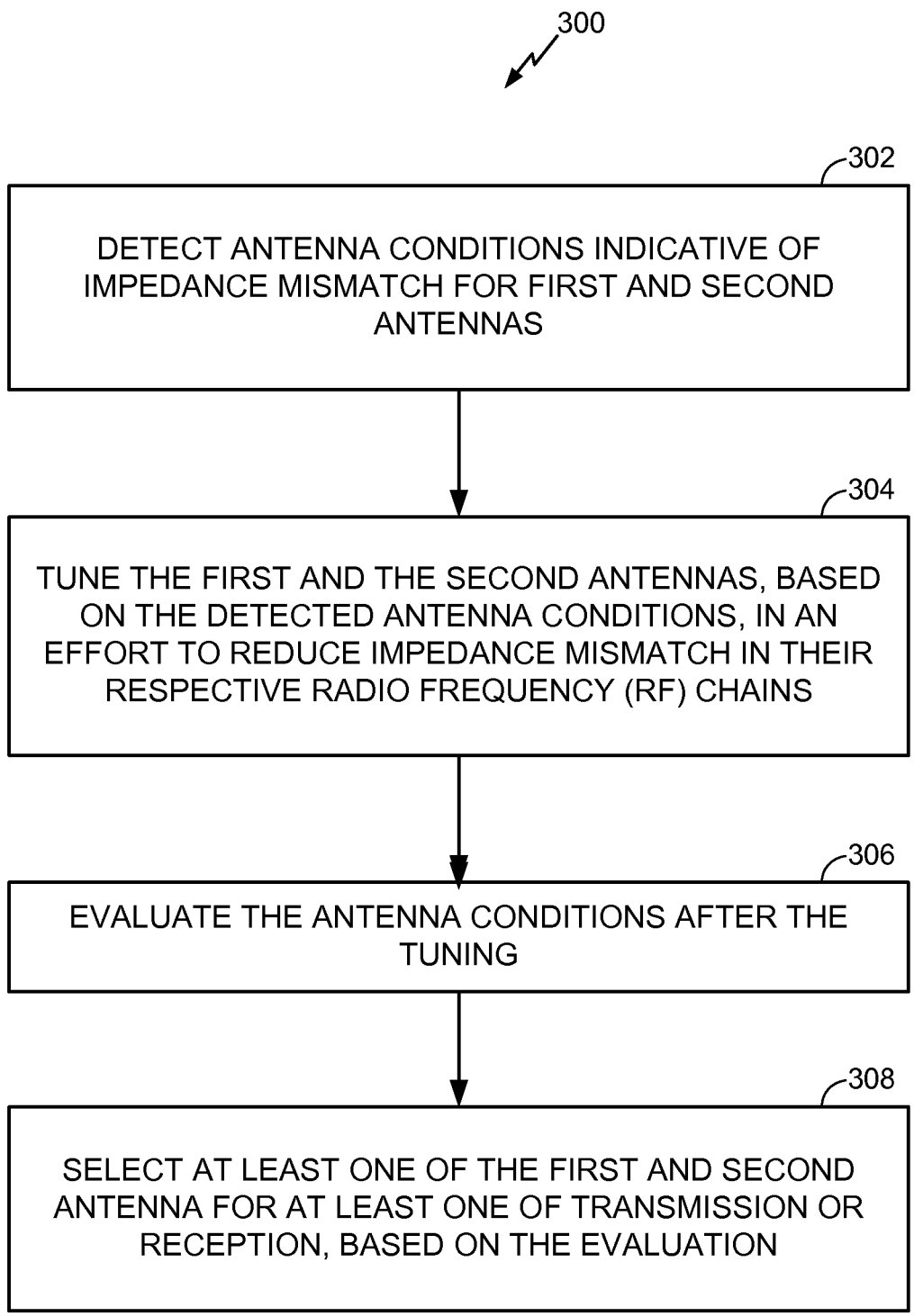
FIG. 3 illustrates example operations for antenna tuning and transmit path selection in accordance with some embodiments.

FIG. 3 illustrates example operations 300 for antenna switching and selection, according to certain aspects of the present disclosure. As noted above, the operations 300 may be performed, for example, by one or more processors of a wireless device, such as processor 204 of UE 202 shown in FIG. 2.

The operations 300 begin, at 302, by detecting antenna conditions indicative of impedance mismatch for first and second antennas. As will be described in greater detail below, the antenna conditions may be measured, for example, by impedance detectors and/or power detectors in an RF front end.

In some cases, to detect conditions on both antennas, one antenna may be periodically enabled for the sole purpose of performing such detection and updating conditions for that antenna. In other words, that antenna may be enabled even if conditions would not necessarily dictate such switching.

Figure 9:
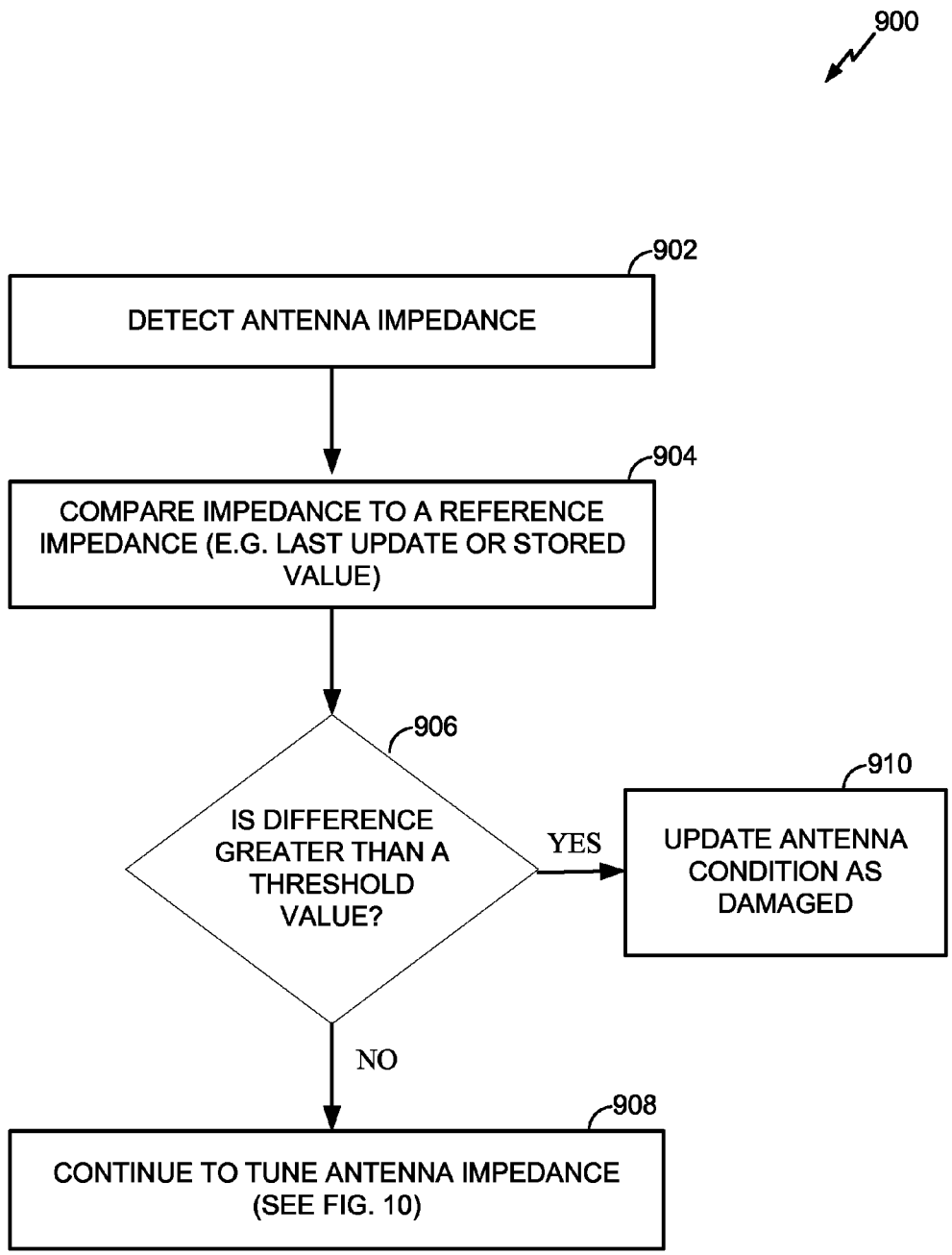
FIG. 9 illustrates example operations for making an early decision based on antenna impedance in accordance with some embodiments.

At 304, the first and the second antennas are tuned. Tuning can be based on detected antenna conditions to reduce impedance mismatch in their respective radio frequency (RF) chains. FIG. 9, described below, illustrates example operations that may be performed to tune an antenna. At 306, the antenna conditions are evaluated after the tuning.

At 308, at least one of the first antenna or the second antennas is selected for transmission and/or reception based on evaluation of the antenna conditions after the tuning For example, one of the antennas may be selected for transmission, while a second antenna is selected for receiver diversity. As noted above, a receive diversity path to an antenna may be disabled based on, or independent of, transmission performance for that antenna, for example, to save power.

As discussed above, according to certain aspects, a proposed antenna path tuning and selection algorithm may quickly select a preferred transmit path and maximize diversity gain for receive (Rx) and Tx paths. In some scenarios, quick selection can be done without waiting on additional information (e.g., BST power information updates) prior to considering operational parameters about antenna operating status. The algorithm may help detect a damaged antenna or mismatch on both antennas (e.g., primary and diversity) and may allow closed-loop tuning for both antenna paths. As will be described below, the algorithm may also allow for an early decision on Tx path antenna choice by comparing parameters of the two antennas, such as antenna condition (e.g. damage) detection results and/or mismatch condition after tuning This early decision may help reduce power consumption by quickly switching a Tx/Rx path to a better antenna, in some cases, minimizing performance impact in case of a damaged antenna. This may be considered an early or quick decision because the decision may be made relatively early in the algorithm (e.g., before performing more lengthy tuning operations).

Those skilled in the art will appreciate that although the proposed method is described for two antennas (e.g., a primary and a diversity antenna), any number of antennas may be used in a device. The proposed antenna tuning and selection method may easily be utilized to switch between any number of antennas. Further, while examples presented herein show a single transmit antenna active at any time, those skilled in the art will appreciate that the techniques may also be applied to switch between groups of transmit antennas, for example, used in MIMO applications.

Figure 4:
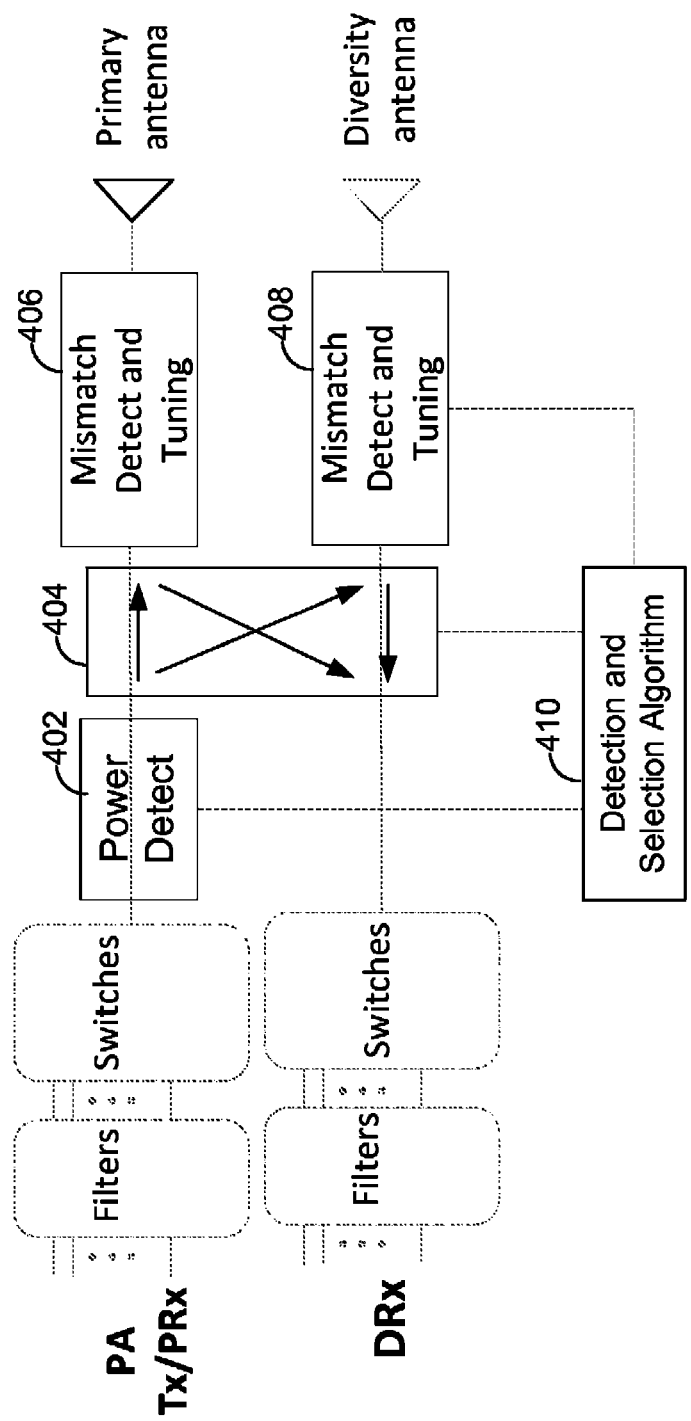
FIG. 4 illustrates an example high level block diagram of antenna tuning and transmit path selection in accordance with some embodiments.

FIG. 4 illustrates an example high level block diagram of a system capable of implementing antenna tuning and transmit path selection, in accordance with certain aspects of the present disclosure.

As illustrated, the system may include detection and selection algorithm logic 410 (that may be any combination of hardware, software, and firmware) configured to control a cross switch 404 to select between primary and/or diversity antennas based on antenna conditions detected by power detection circuitry 402, mismatch detection and tuning circuitry 406 and 408 for both the primary and the diversity antennas, respectively. The detection and selection algorithm logic 410 may also tune each antenna, via logic 406 and 408, in an effort to reduce mismatch in each antenna path.

Figure 5:
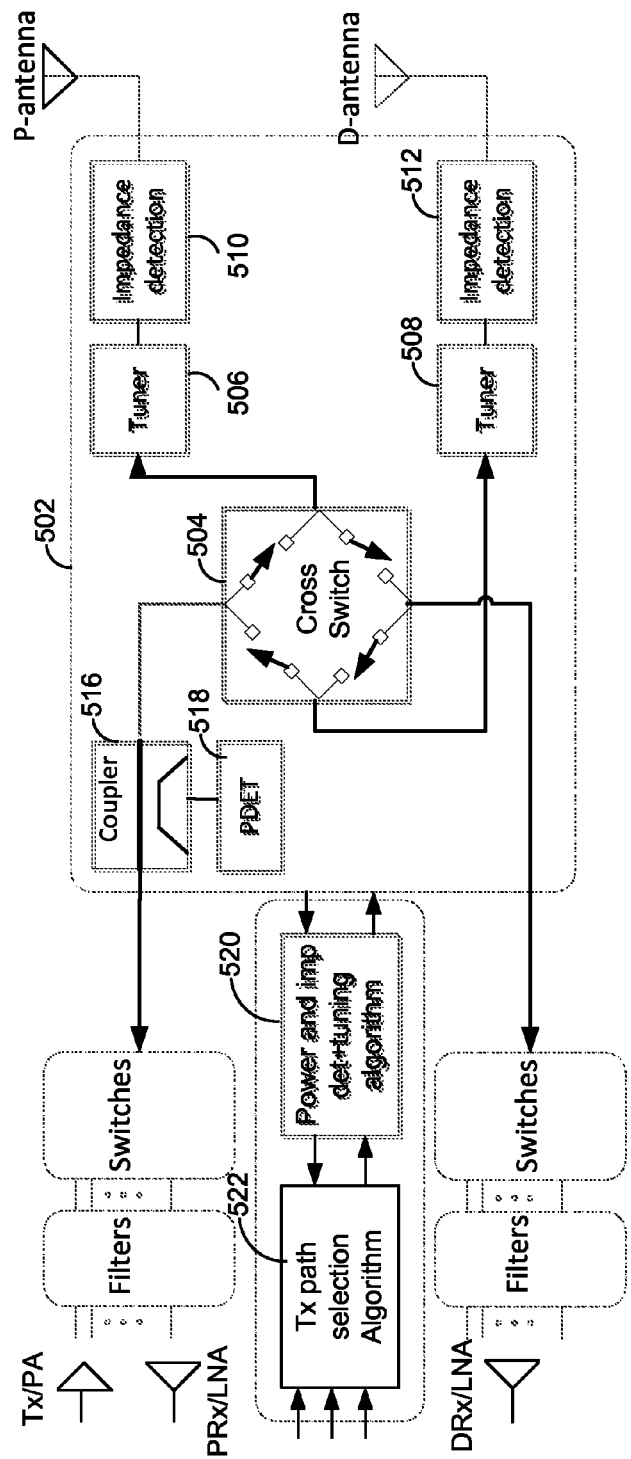
FIG. 5 illustrates an example block diagram of antenna tuning and transmit path selection in accordance with some embodiments.

As illustrated in FIG. 5, the Tx power detection may be performed via a coupler 516 and power detection logic 518, while each antenna path may have its own tuner (506, 508) and impedance detection circuit (510, 512).

In some cases, these components may be integrated within a single RF front end (RFFE) device 502 that provides information on mismatch or damage condition of antennas, based on a Tx signal from a selected antenna at a current time. The Tuner/Coupler/PDET components may be used to help match each antenna impedance (e.g., to 50 ohm) to minimize power loss to improve performance and lower power consumption.

Detection and tuning algorithm logic 520 may, for example, utilize software/firmware on a processor to control tuners 506/508 (based on inputs from impedance detection circuits 510/512 and power detector 518) to achieve optimal matching.

As illustrated, cross switch 504, may have four switches, S1-S4, allowing transmit path selection algorithm logic 522 to select either or both antenna for transmit and/or reception. Example operations for selecting a transmit path are described below, with reference to FIG. 11.

Figure 6:
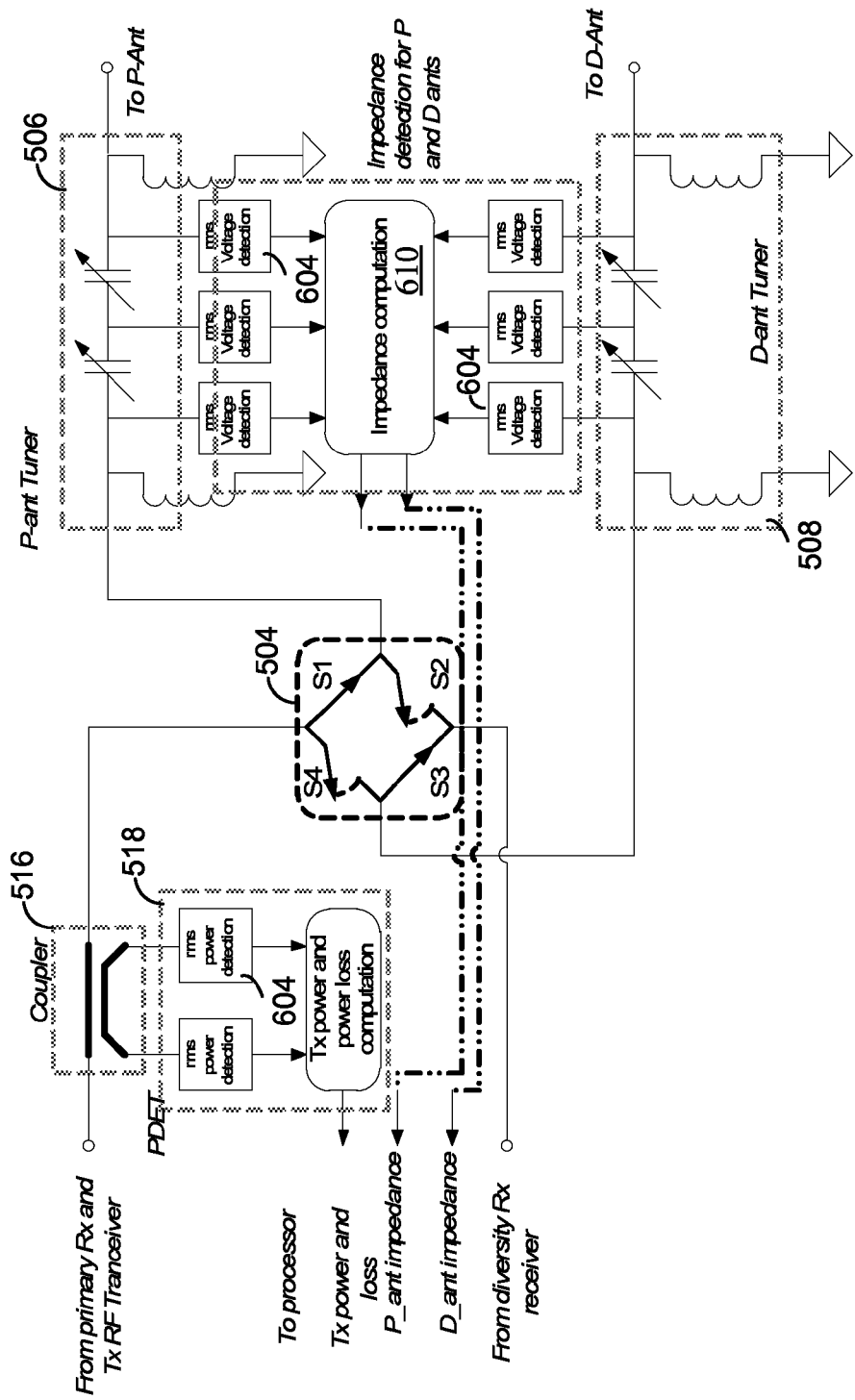
FIG. 6 illustrates an example implementation for antenna tuning and transmit path selection in a first state in accordance with some embodiments.

FIG. 6 illustrates example embodiments of power detection logic 518, tuners 506, 508, and impedance detection logic 510, 512, in greater detail. As illustrated, power detection logic 518 may include RMS power detection circuits 606 that output signals indicative of RMS power measurements, as well as Tx power and power loss computation logic 608 configured to calculate Tx power and loss measurements (e.g., to provide to power and impedance detection tuning algorithm logic and Tx path selection algorithm logic 522 shown in FIG. 5).

As illustrated, impedance detection logic 510, 512, may include RMS voltage detection circuits 604 that output signals indicative of RMS voltage measurements, as well as Tx power and impedance computation logic 610 configured to calculate impedance measurements for each antenna (e.g., to provide to power and impedance detection tuning algorithm logic 520 and Tx path selection algorithm logic 522 shown in FIG. 5). Each tuner 506 and 508 may allow each antenna to be tuned by adjusting one or more components (e.g., effective capacitance) in various configurations and component topologies (e.g., R-configurations or Pi-configurations), for example, via a digital interface.

Figure 7:
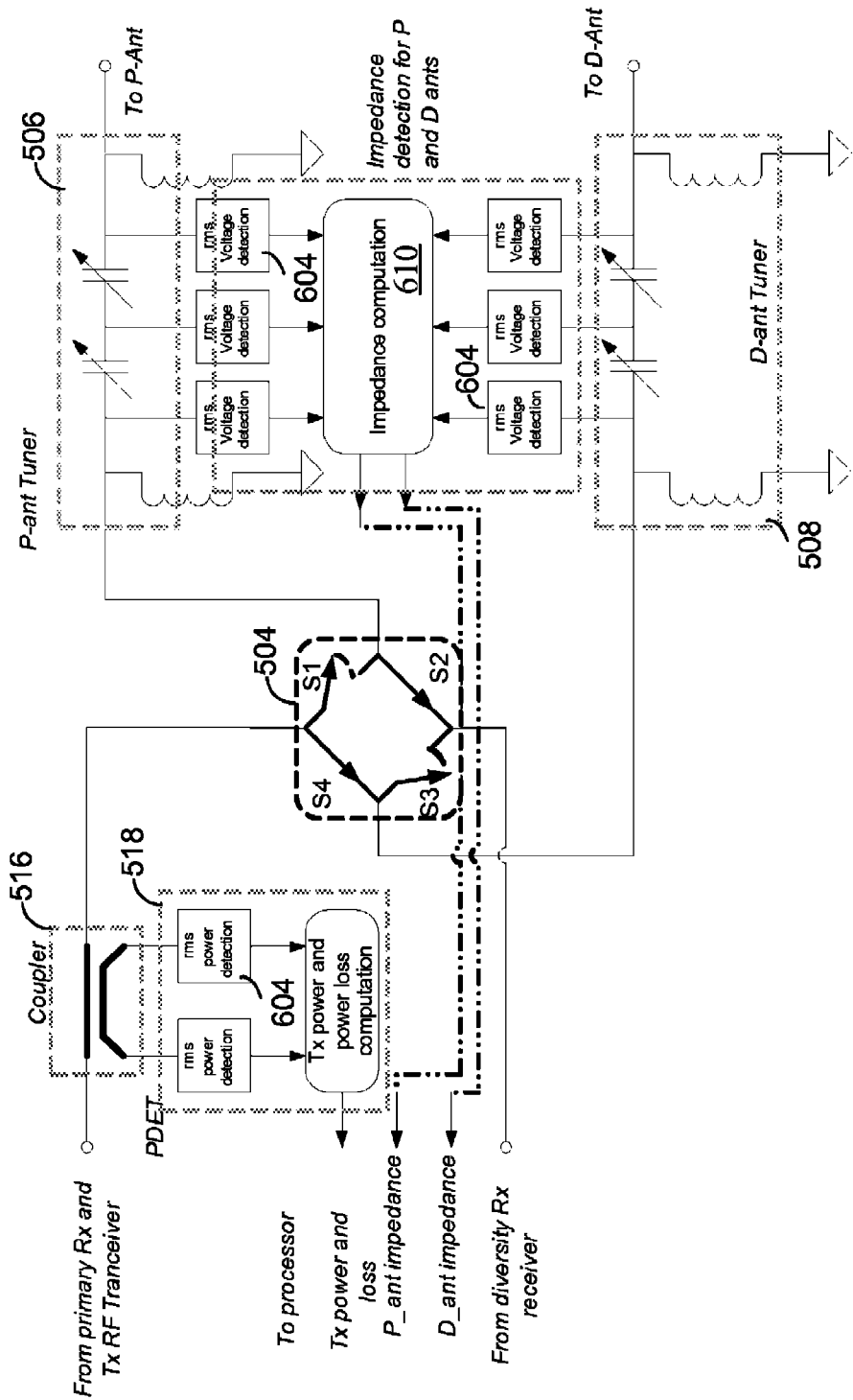
FIG. 7 illustrates an example implementation for antenna tuning and transmit path selection of FIG. 6 in a second state in accordance with some embodiments.

As illustrated in FIG. 6, the cross-switch may be placed in a first state, with switches S1 and S3 closed (S2 and S4 opened) to select the P-antenna for transmission and the D-antenna for Rx diversity. As illustrated in FIG. 7, the cross-switch may be placed in a second state, with switches S2 and S4 closed (S1 and S3 opened) to select the D-antenna for transmission and the P-antenna for Rx diversity. The second state 504 of FIG. 7 is a further feature shown in FIG. 7 relative to FIG. 6.

While not shown, in some cases, neither antenna may be selected for Rx diversity. For example, Rx diversity may be disabled if one of the antennas is determined to be damaged to save power (or simply to save power regardless of antenna condition).

Figure 8:
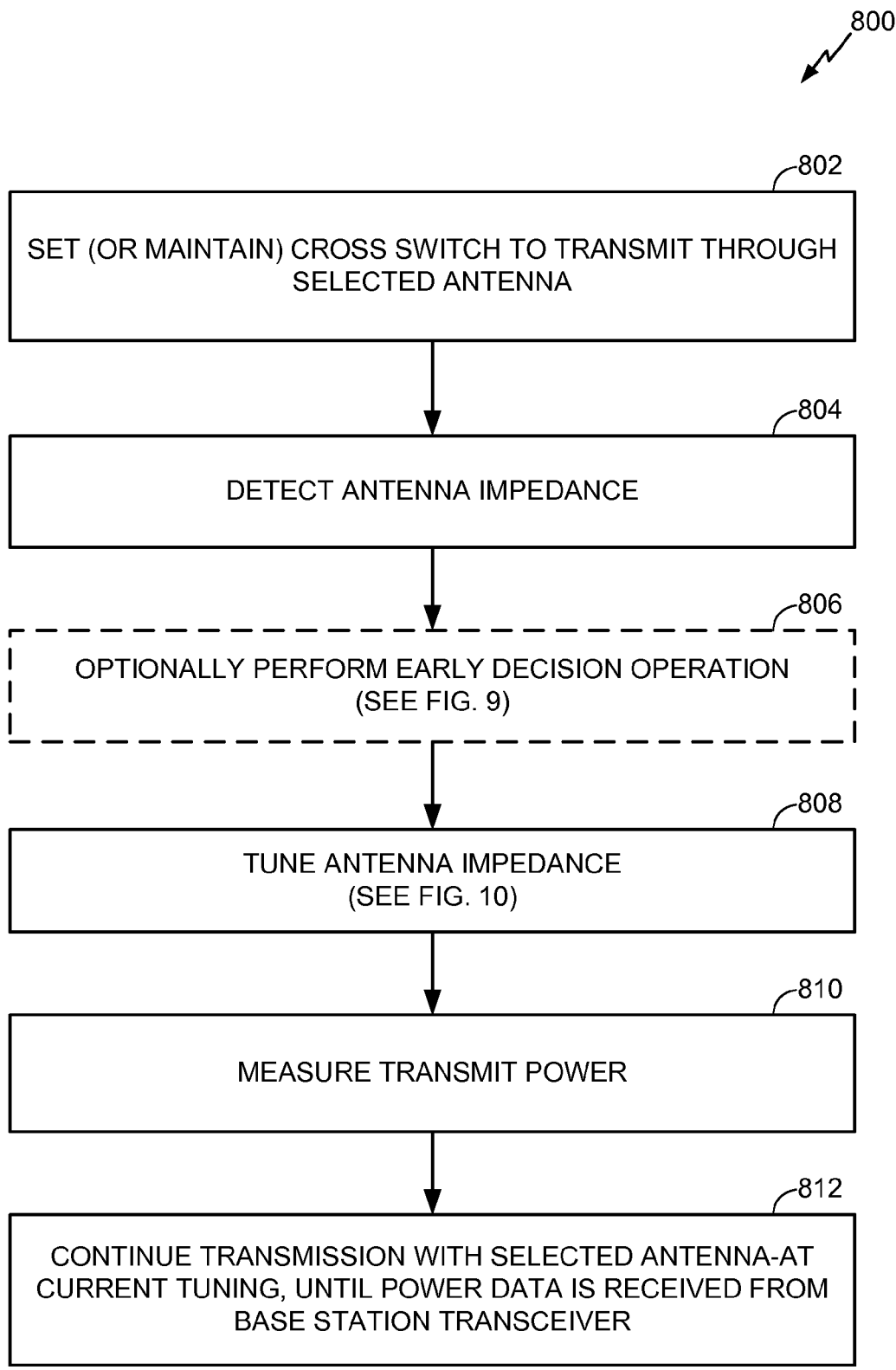
FIG. 8 illustrates example operations for antenna tuning and power detection for a selected transmit antenna in accordance with some embodiments.

FIG. 8 illustrates example operations 800 for antenna tuning and power detection for a selected transmit antenna, in accordance with certain aspects of the present disclosure. The operations 800 may be performed alternately, for different selected antennas, to update the conditions for both and allow intelligent antenna selection. For example, in some cases, while a first antenna is selected for transmission based on antenna conditions, the other antenna may be temporarily selected for the purpose of updating its conditions.

The operations 800 begin, at 802, by setting (or maintaining) the cross-switch to transmit through a selected antenna. At 804, antenna impedance is detected. At 808, assuming no early decision was made regarding a damaged antenna, antenna impedance for the selected antenna is tuned and, at 810, transmit power is measured. As described below with reference to FIG. 10, antenna tuning may be an iterative process, with tuner settings adjusted until an acceptable transmit power level is achieved.

At 812, transmission is continued with the selected antenna, at a current tuning, until power data/information is received from the base station transceiver (BST). This information may indicate, for example, the effective transmission power based on receive power strength as determined at the BST. In some cases, switching may be limited for various purposes and to avoid unnecessary switching. Thus, as indicated, the device may continue to transmit on a selected antenna until stable power data is received from the BST.

As described above, in some cases, one antenna may be used for transmission, while the other is used for Rx diversity. The operations described below may be used to determine antenna conditions and make decisions regarding both transmission antenna selection and Rx diversity antenna selection. As noted above, even if a primary antenna (P-Ant) is currently selected for transmission, operations 800 may occasionally performed to update antenna conditions for a secondary or diversity antenna (D-Ant).

In some cases, operations 808-812 may be considered part of a relatively slow antenna selection algorithm. In this scenario, the algorithm can wait for stable power data from the BST and may also consider geo-sensor input. These relatively slow operations might result in wasting power through transmissions via a damaged antenna.

As illustrated in FIG. 8, however, an early decision operation may optionally be performed, at 806. In some cases, if a damaged antenna is detected in this early decision operation, the selected antenna may be disabled immediately, and operations 808-812 may not be performed. This early decision may, thus, help save power, for example, by switching away from a damaged (or otherwise subpar) antenna.

FIG. 9 illustrates an example flow diagram for making an early decision based on antenna impedance, in accordance with certain aspects of the present disclosure.

The operations 900 begin, at 902, by detecting antenna impedance for a selected antenna. At 904, the antenna impedance is compared to a reference impedance (e.g., a previously detected impedance measurement, a stored value, or some other reference value). If the difference between the detected impedance and the reference is above a threshold value (e.g., as determined at 906), the antenna condition may be updated as "damaged" at 910. As noted above, in this case, the UE may immediately switch to the other antenna.

On the other hand, if the difference between the detected impedance and the reference is not above the threshold value (e.g., the antenna is not considered damaged), the UE may continue, at 908, to tune antenna impedance for the selected antenna.

Figure 10:
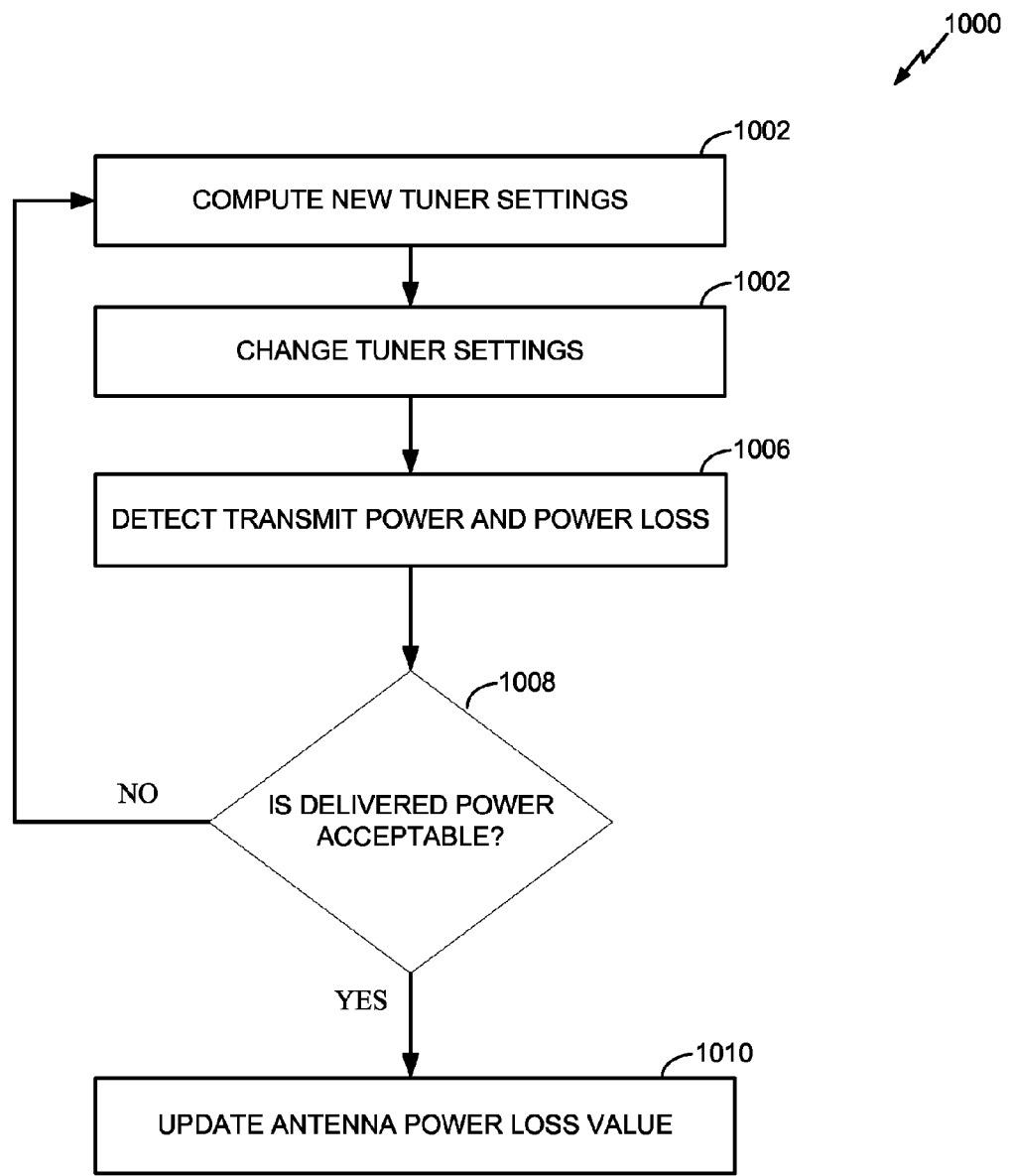
FIG. 10 illustrates example operations for antenna tuning in accordance with some embodiments.

FIG. 10 illustrates example operations 1000 for antenna tuning, in accordance with certain aspects of the present disclosure.

FIG. 10 illustrates example operations 1000 for antenna tuning and detection (e.g., corresponding to operation 808 shown in FIG. 8). Tuner settings may be computed, at 1002, for example, based on a current impedance and power detection measurement. In some cases, the tuner settings may be obtained via a look-up table (e.g., using a current detected impedance as an index into the table).

At 1004, the tuner setting changed, based on the computed setting. After tuning, Tx power and power loss may be detected, at 1006. If delivered power is not acceptable (e.g., not at an expected maximum value), as determined at 1008, new tuner settings may, again, be computed at 1002.

As illustrated, the operations 1002-1006 may be repeated until delivered power is found to be acceptable. Once delivered power is acceptable, antenna power loss value (detected at 1006) is updated for the selected antenna at 1010. In some cases, if tuning does not result in acceptable delivered power after a maximum number of iterations, the algorithm may still be exited, and antenna conditions updated (e.g., based on the most recent measurements)

Figure 11:
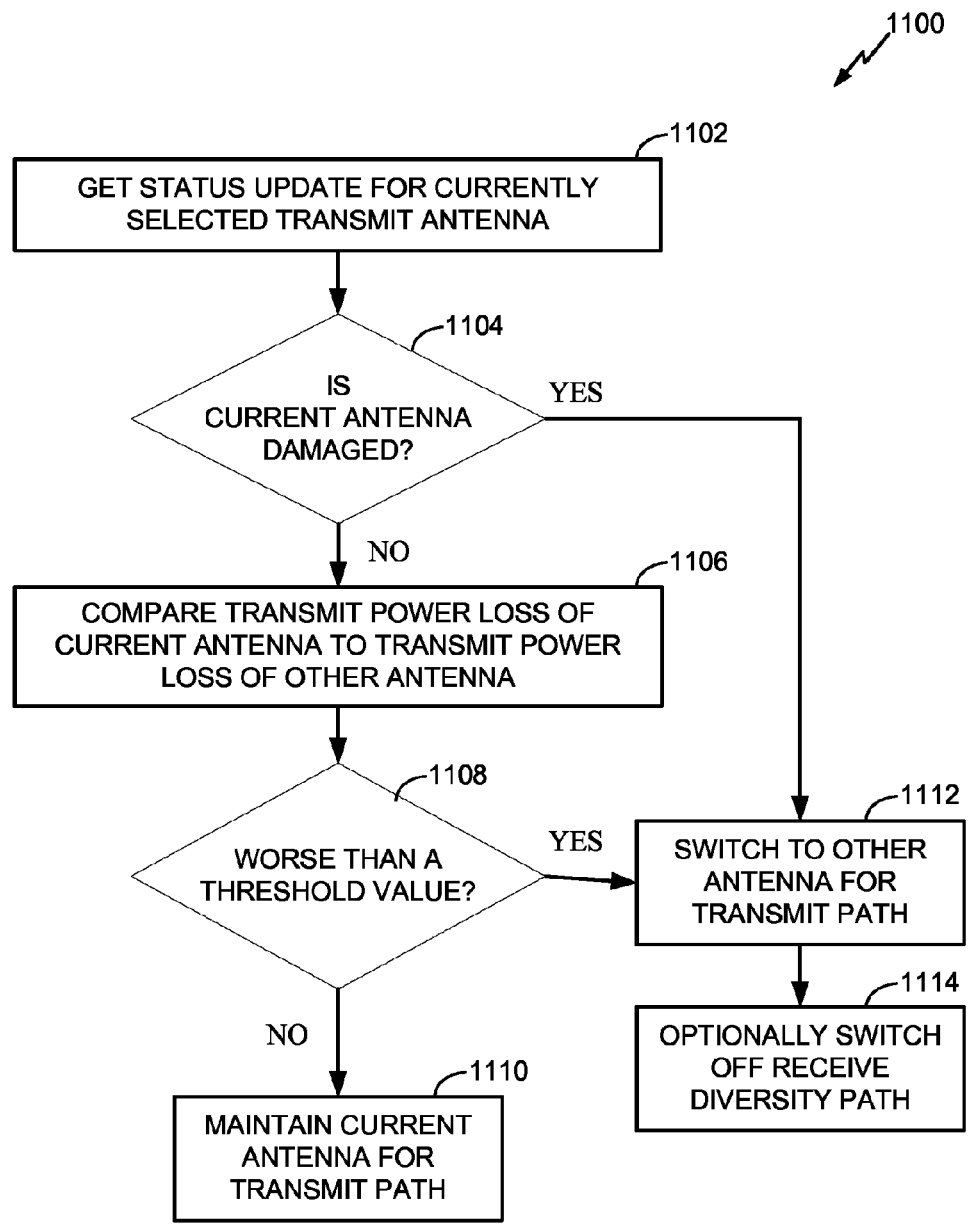
FIG. 11 illustrates example operations for antenna selection in accordance with some embodiments.

With antennas tuned and antenna conditions updated, via the operations shown in FIGS. 9 and 10, the UE may apply an antenna selection algorithm to select an antenna for transmission. FIG. 11 illustrates example operations 1100 for antenna selection, in accordance with certain aspects of the present disclosure.

The operations 1100 begin, at 1102, by obtaining a status update for the currently selected transmit antenna. If the currently selected antenna is damaged, as determined at 1104, the UE may immediately switch to the other antenna for transmission. The UE may also optionally disable a receive diversity path through this antenna, at 1114.

Even if the current antenna is not damaged, if its performance (e.g., impedance mismatch or power loss) is worse than a threshold value, as determined at 1108, a decision may still be made to stop using the current antenna and switch back to the other antenna (and/or turn off diversity receive path for this antenna).

Therefore, at 1106, the UE compares the transmit power loss of the current antenna to the transmit power loss of the other antenna. If the transmit power loss of the current antenna is not worse than the transmit power loss of the other antenna by a threshold value, the UE may maintain the current antenna for transmission, at 1110.

On the other hand, if the transmit power loss of the current antenna is worse than the transmit power loss of the other antenna by a threshold value, the UE may immediately switch to the other antenna for transmission, at 1112 and, optionally disable a receive diversity path through this antenna, at 1114.

Requiring transmit power loss to be worse than transmit power loss by a threshold value for varying antennas can provide some hysteresis and prevent rapid switching between antennas. The threshold value may be set to any suitable value that allows for switching to a more efficient antenna while still preventing rapid switching. In some cases, the threshold value may be variable and, in some cases, may depend on operating conditions. For example, a lower threshold value may be used for more aggressive power savings. Threshold values can vary based on component and device design to obtain desired operational characteristics.

In some cases, how and when the operations shown in FIGS. 8-11 are performed may vary based on various criteria. For example, in some cases, conditions for a non-selected antenna may only be updated periodically, so as not to interfere with transmissions from a currently selected antenna. Therefore, conditions for a non-selected antenna may be updated more often when there are less transmission from the UE (uplink transmissions).

In some cases, more or less aggressive power savings may be sought. For example, in some cases, if remaining battery life is determined to be low, a UE may attempt to save power more aggressively, possibly switching antennas more often.

In some cases, channel conditions may also affect how antenna switching. For example, with good channel conditions between a UE and base station, it may be more acceptable to transmit on a less efficient antenna.

In some cases, how and when antenna selection is performed may be based, at least in part, on user or network settings. For example, a user may be able to select more or less aggressive power savings settings (e.g., with a tradeoff between performance and battery life). In some cases, a network may configure how and when a UE performs antenna condition detection and selection, for example, via higher layer (e.g., radio link control RLC) signaling, based on channel and/or traffic conditions monitored by a base station.

For certain aspects, the proposed techniques may be used in mobile devices that prefer diversity across 2G/3G and 4G air interfaces. The proposed techniques may help improve diversity receive (DRx) antenna receiving efficiency, for example, by 1-2 dB under hand/head effect, and other impacts on diversity antenna radiation environment.

The various operations of methods described above may be performed by various hardware and/or software component(s) and/or module(s) corresponding to means-plus-function blocks illustrated in the Figures. For example, means for detecting, means for tuning, and/or means for selecting may be performed by any suitable processing element, such as the processor 204 in FIG. 2.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims. In addition, the discussed methods can also include receiving data from a database for antenna selection/tuning and also writing data to a database for use in future antenna selection/tuning. As discussed above, by having and/or using a database, a wireless device can refer to stored data when its components are determining when it may be prudent to select and tune antennas for transmission and reception of wireless signals.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to embodiments of the present disclosure, other and further embodiments of the disclosure may be devised without departing from the basic scope thereof, and the scope thereof is determined by the claims that follow.

We claim:

1. A method for antenna selection at a wireless communications device, the comprising:
    detecting antenna conditions for first and second antennas;
    tuning the first and the second antennas, based on the detected antenna conditions, to reduce impedance mismatch in their respective radio frequency (RF) chain;
    detecting whether one or more of the first and second antennas are damaged based on the detected antenna conditions, wherein the tuning of at least one of the first and second antennas is terminated early when one or more of the first and second antennas are determined to be damaged; and selecting at least one of the first antenna or the second antenna for at least one of transmission or reception, based on an evaluation of the antenna conditions after the tuning.

2. The method of claim 1, wherein the selecting comprises: selecting either the first antenna or the second antenna for transmission based on the evaluation.

3. The method of claim 1, wherein the selecting comprises: selecting neither, one, or both of the first and second antennas for reception, based on the evaluation.

4. The method of claim 1, wherein the selecting comprises:
selecting the first antenna when the second antenna is damaged; or selecting the second antenna when the first antenna is damaged, wherein a damaged antenna has a measured performance below a predetermined threshold.

5. The method of claim 1, comprising: switching off a receive antenna path for at least one of the first or second antennas when performance of at least one of the first or the second antennas is below a certain threshold.

6. The method of claim 1, wherein detecting antenna conditions comprises:
measuring transmit power loss through the first and the second antennas.

7. The method of claim 1, wherein the tuning comprises: performing a closed-loop algorithm, wherein tuning is iteratively adjusted based on obtained antenna performance information.

8. The method of claim 1, further comprising: detecting antenna conditions of the first and the second antennas after tuning.

9. The method of claim 7, wherein the obtained antenna performance information comprises at least one of information received from a base station and detected transmit power loss.

10. An apparatus for wireless communications, comprising:
means for detecting antenna conditions indicative of impedance mismatch for first and second antennas;
means for tuning the first and the second antennas, based on the detected antenna conditions, to reduce impedance mismatch in their respective radio frequency (RF) chain;
means for detecting whether one or more of the first and second antennas are damaged based on the detected antenna conditions, wherein the tuning of at least one of the first and second antennas is terminated early when one or more of the first and second antennas are determined to be damaged;
means for evaluating the antenna conditions after the tuning; and
means for selecting at least one of the first antenna or the second antenna for at least one of transmission or reception, based on the evaluation of the antenna conditions after the tuning.

11. The apparatus of claim 10, wherein the means for selecting selects either the first antenna or the second antenna for transmission based on the evaluation.

12. The apparatus of claim 10, wherein the means for selecting selects neither, one, or both of the first and second antennas for reception based on the evaluation.

13. The apparatus of claim 10, wherein the means for selecting: selects the first antenna when the second antenna is damaged; or selects the second antenna when the first antenna is damaged, wherein a damaged antenna has a measured performance below a predetermined threshold.

14. The apparatus of claim 10, further comprising a means for switching off a receive antenna path for at least one of the first or second antennas when performance of at least one of the first or the second antennas is below a certain threshold.

15. The apparatus of claim 10, wherein the means for detecting measures transmit power loss through the first and the second antennas.

16. The apparatus of claim 10, wherein the means for tuning performs a closed-loop algorithm, wherein tuning is iteratively adjusted based on obtained antenna performance information.

17. The apparatus of claim 10, further comprising: detecting antenna conditions of the first and the second antennas after tuning.

18. An apparatus for wireless communications comprising:
a communication interface; and
at least one processor configured to:
detect antenna conditions indicative of impedance mismatch for first and second antennas;
tune the first and the second antennas, based on the detected antenna conditions, to reduce impedance mismatch in their respective radio frequency (RF) chain;
detect whether one or more of the first and second antennas are damaged based on the detected antenna conditions, wherein the tuning of at least one of the first and second antennas is terminated early when one or more of the first and second antennas are determined to be damaged; and
evaluate the antenna conditions after the tuning; and
select at least one of the first antenna or the second antenna for at least one of transmission or reception, based on the evaluation of the antenna conditions after the tuning.

19. The apparatus of claim 18, wherein the processor is configured to select either the first antenna or the second antenna for transmission based on the evaluation.

20. The apparatus of claim 18, wherein the processor is configured to select neither, one, or both of the first and second antennas for reception, based on the evaluation.

21. The apparatus of claim 18, wherein the processor is configured to select the first antenna when the second antenna is damaged; or selecting the second antenna when the first antenna is damaged, wherein a damaged antenna has a measured performance below a predetermined threshold.

22. The apparatus of claim 18, wherein the processor is configured to switch off a receive antenna path for at least one of the first or second antennas when performance of at least one of the first or the second antennas is below a certain threshold.

23. The apparatus of claim 18, wherein the processor is configured to obtain measurements measuring transmit power loss through the first and the second antennas.

24. The method of claim 18, wherein the processor is configured to instruct a tuner to perform a closed-loop algorithm, wherein tuning is iteratively adjusted based on obtained antenna performance information.

25. A computer program product comprising a non-transitory computer readable medium having instructions stored thereon, the instructions executable by one or more processors for:
detecting antenna conditions indicative of impedance mismatch for first and second antennas;

tuning the first and the second antennas, based on the detected antenna conditions, to reduce impedance mismatch in their respective radio frequency (RF) chain;

detecting whether one or more of the first and second antennas are damaged based on the detected antenna conditions, wherein the tuning of at least one of the first and second antennas is terminated early when one or more of the first and second antennas are determined to be damaged; and evaluating the antenna conditions after the tuning; and selecting at least one of the first antenna or the second antenna for at least one of transmission or reception, based on the evaluation of the antenna conditions after the tuning.

26. A user equipment (UE), comprising:

a plurality of antennas comprising at least first and second antennas;

detection circuitry for detecting antenna conditions indicative of impedance mismatch for the first and second antennas;

tuning circuitry for tuning the first and the second antennas, based on the detected antenna conditions, to reduce impedance mismatch in their respective radio frequency (RF) chain;

circuitry for detecting whether one or more of the first and second antennas are damaged based on the detected antenna conditions, wherein the tuning of at least one of the first and second antennas is terminated early when one or more of the first and second antennas are determined to be damaged; and a cross-switch configured to selectively include at least one of the first or second antennas in at least one of a transmission path or a diversity receive path; and at least one processor configured to evaluate antenna conditions after the tuning, and configured to select, via the cross-switch, at least one of the first antenna or the second antenna for at least one of transmission via the transmission path or reception via the diversity receive path, based on the evaluation of the antenna conditions after the tuning.

27. The UE of claim 26, wherein the cross switch is configured to select neither, one, or both of the first and second antennas for reception, based on the evaluation.

28. The UE of claim 26, wherein the cross switch is configured to select the first antenna when the second antenna is damaged; or select the second antenna when the first antenna is damaged, wherein a damaged antenna has a measured performance below a predetermined threshold.

29. The UE of claim 26, wherein the cross switch is configured to switch off a receive antenna path for at least one of the first or second antennas when performance of at least one of the first or the second antennas is below a certain threshold.

30. The UE of claim 26, wherein the tuning circuitry is configured to perform a closed-loop algorithm, wherein tuning is iteratively adjusted based on obtained antenna performance information.

* * * * *